US012690113B2

(12) United States Patent
Huang

(10) Patent No.: US 12,690,113 B2
(45) Date of Patent: Jul. 21, 2026

(54) LIGHTING EFFECT EDITING DEVICE AND METHOD

(71) Applicant: NUVOTON TECHNOLOGY CORPORATION, Hsinchu City (TW)

(72) Inventor: Chun-Hao Huang, Zhubei City (TW)

(73) Assignee: NUVOTON TECHNOLOGY CORPORATION, Hsinchu City (TW)

( * ) Notice: Subject to any disclaimer, the term of this patent is extended or adjusted under 35 U.S.C. 154(b) by 119 days.

(21) Appl. No.: 18/924,388

(22) Filed: Oct. 23, 2024

(65) Prior Publication Data

US 2025/0247934 A1 Jul. 31, 2025

(30) Foreign Application Priority Data

Jan. 30, 2024 (TW) ................................ 113103605

(51) Int. Cl.
*H05B 47/165* (2020.01)

(52) U.S. Cl.
CPC .................................. *H05B 47/165* (2020.01)

(58) Field of Classification Search
None
See application file for complete search history.

(56) References Cited

U.S. PATENT DOCUMENTS

2005/0248299 A1* 11/2005 Chemel ................ H05B 47/155 315/312
2014/0104497 A1* 4/2014 Li .......................... G11B 27/10 348/602
2024/0419310 A1* 12/2024 Zhu .................. H04M 1/72427

* cited by examiner

*Primary Examiner* — James A Thompson
(74) *Attorney, Agent, or Firm* — MUNCY, GEISSLER, OLDS & LOWE, P.C.

(57) ABSTRACT

When a developer edits a lighting effect file played by single one or multiple light emitting units of a sounding and lighting device, a lighting effect editing device and method provided by the present disclosure enable the developer to simultaneously determine whether playing single one lighting effect file once, playing single one lighting effect file repeatedly, playing a concatenation of multiple lighting effect files once, playing a concatenation of multiple lighting effect files repeatedly, playing a mixture of multiple lighting effect files once, playing multiple lighting effect files simultaneously once, playing multiple lighting effect files simultaneously repeatedly, playing multiple concatenation lighting effect files simultaneously once or playing multiple concatenation lighting effect files simultaneously repeatedly generates a flicker frequency not meeting a predetermined specification. In addition, when there exists the flicker frequency not meeting the predetermined specification, the developer may be notified of a location of a corresponding sampling time point.

11 Claims, 7 Drawing Sheets

LIGHTING EFFECT EDITING DEVICE AND METHOD

CROSS-REFERENCE TO RELATED APPLICATION

This application claims the priority from the TW Patent Application No. 113103605, filed on Jan. 30, 2024, and all contents of such TW Patent Application are comprised in the present disclosure.

BACKGROUND

1. Field of the Invention

The present disclosure relates to a lighting effect editing device and method, in particular to, a lighting effect editing device and method that enable, when a developer edits a lighting effect file, the developer to directly check whether a single lighting effect file or a mixture of multiple sounding effect files causes a flicker frequency of a light emitting unit to exceed a predetermined specification and prompt a sampling time point of the lighting effect file where the flicker frequency exceeds the predetermined specification. Consequently, the developer is enabled to instantly edit and correct the lighting effect file.

2. Description of the Related Art

Regulations in more and more regions have regulated that a flicker frequency of toy lights cannot fall within a specific frequency range, since flickering within the specific frequency range can harm human eyes, particularly those of children. The existing detection method uses video recording and checks with human eyes by slowing down the playback speed. However, this method can only check the flicker frequency of one light at a time, and it is also difficult to check the flicker frequency of multiple lights after mixing. In addition, multiple lighting effect files are concatenated into a continuous lighting effect by programs, resulting in an extension of the time required for manual checks. Even if lighting effects that do not meet the specifications are checked and found, it is difficult to find their exact location within the lighting effect files.

SUMMARY

Based on at least one purpose of the present disclosure, the present disclosure provides a lighting effect editing device, including: a lighting effect file acquisition module, configured to acquire at least one first lighting effect file, wherein at least one light emitting unit plays the first lighting effect file to emit light; an editing module, signally connected to the lighting effect file acquisition module, and configured to edit at least one second lighting effect file, wherein the second lighting effect file is the first lighting effect file or generated from the first lighting effect file; and an output module, signally connected to the editing module, and configured to output the edited second lighting effect file, wherein the editing module includes a flicker frequency checking module configured to target a portion of sampling time points of a third lighting effect file based on light emitting intensities of the sampling time points, wherein based on the targeted sampling time points of the third lighting effect file, the flicker frequency checking module determines whether the third lighting effect file has at least one flicker frequency exceeding a predetermined specification, and prompting the sampling time point of the third lighting effect file where the flicker frequency exceeds the predetermined specification, wherein the third lighting effect file is the second lighting effect file or generated from the second lighting effect file.

Based on at least one purpose of the present disclosure, the present disclosure provides a lighting effect editing method, including: acquiring at least one first lighting effect file, wherein a light emitting unit plays the first lighting effect file to emit light; providing an editing screen for editing a second lighting effect file, wherein the second lighting effect file is the first lighting effect file or generated from the first lighting effect file; targeting a portion of a plurality of sampling time points of a third lighting effect file according to a plurality of light emitting intensities of the plurality of sampling time points, wherein the third lighting effect file is the second lighting effect file or generated from the second lighting effect file; determining, according to the targeted sampling time points of the third lighting effect file, whether the third lighting effect file has at least one flicker frequency exceeding a predetermined specification, and prompting the sampling time point of the third lighting effect file where the flicker frequency exceeds the predetermined specification; and outputting the edited second lighting effect file.

Based on at least one purpose of the present disclosure, the present disclosure provides a lighting effect editing device, including: a lighting effect file acquisition module, configured to acquire a lighting effect file, wherein a light emitting unit plays the lighting effect file to emit light; an editing module, configured to edit the lighting effect file; a flicker frequency checking module, configured to determine whether the edited lighting effect file has a sampling time point at which at least one flicker frequency exceeds a predetermined specification, and prompt the sampling time point of the edited lighting effect file; and an output module, configured to output the edited lighting effect file.

Based on the above, the lighting effect editing device and method provided by the present disclosure solve the technical issues of requiring manual check to determine whether the lighting effects have flicker frequency that fails to meet predetermined specifications. In addition, the lighting effect editing device and method address the technical issues of checking the flicker frequency of multiple light emitting units after mixing. Furthermore, the lighting effect editing device and method may even find the exact location within the lighting effect file where the flicker frequency fails to meet the predetermined specifications.

BRIEF DESCRIPTION OF THE DRAWINGS

The drawings are provided to make the persons with ordinary knowledge in the field of the art further understand the present disclosure, and are incorporated into and constitute a part of the specification of the present disclosure. The drawings illustrate demonstrated embodiments of the present disclosure, and are used to explain the principal of the present disclosure together with the description of the present disclosure.

DESCRIPTION OF THE PREFERRED EMBODIMENTS

Figure 1:
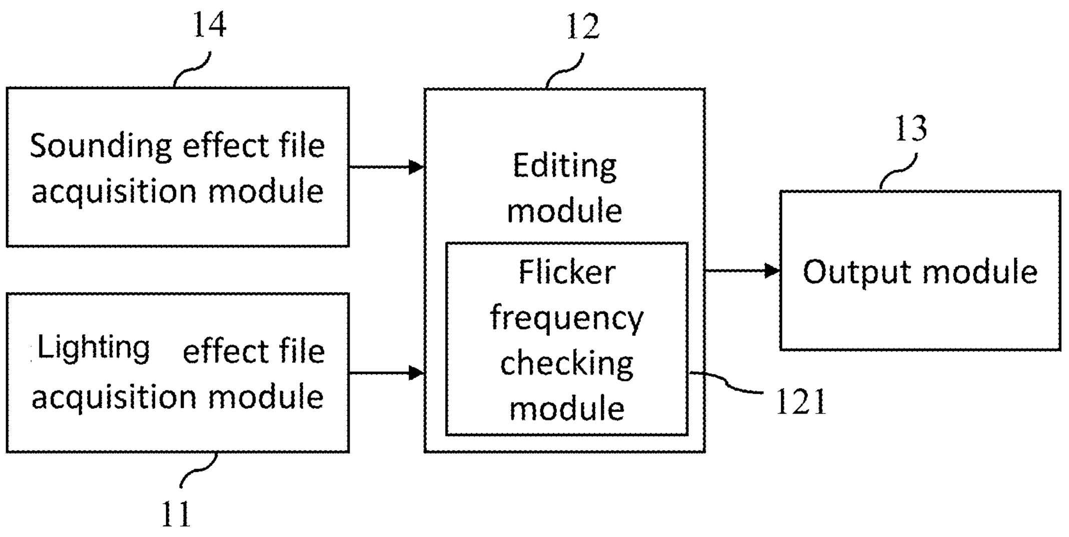
FIG. 1 is a schematic block diagram of a lighting effect editing device according to an embodiment of the present disclosure.

To address the above technical problems, embodiments of the present disclosure provide a lighting effect editing device and method. Reference will now be made in detail to exemplary embodiments of the present disclosure, which will be illustrated in the accompanying drawings. Where possible, the same reference symbols are used in the drawings and the description to refer to the same or similar components. In addition, the implementation of the exemplary embodiment is only one of the realization ways of the design concept of the present disclosure, and the following examples are not intended to limit the present disclosure.

To avoid the technical issues mentioned in the prior art, the present disclosure provides a lighting effect editing device and method. When a developer edits a lighting effect file played by single one or multiple light emitting units of a sounding and lighting device, the lighting effect editing device and method enable the developer to simultaneously determine whether playing single one lighting effect file once, playing single one lighting effect file repeatedly, playing a concatenation of multiple lighting effect files once, playing a concatenation of multiple lighting effect files repeatedly, playing multiple lighting effect files simultaneously once, playing multiple lighting effect files simultaneously repeatedly, playing multiple concatenation lighting effect files simultaneously once or playing multiple concatenation lighting effect files simultaneously repeatedly generates a flicker frequency not meeting a predetermined specification. In addition, when it is determined that there exists the flicker frequency not meeting the predetermined specification, the developer may also be notified of a location of a corresponding sampling time point for facilitating direct editing of lighting effect files by developers to prevent that the developed sounding and lighting devices have the flicker frequencies that do not meet the predetermined specifications. In addition, the aforementioned sounding and lighting device refers to a device having at least one light emitting unit and one sound emitting unit, such as a common toy on the market that is capable of emitting both light and sound. The light emitting unit may, for example, be a light emitting diode (LED), but the present disclosure is not limited thereto.

Please refer to FIG. 1, which is a schematic block diagram of a lighting effect editing device according to an embodiment of the present disclosure. The lighting effect editing device includes a lighting effect file acquisition module 11, an editing module 12, and an output module 13. The lighting effect file acquisition module 11 is used to acquire at least one first lighting effect file. At least one light emitting unit of the device to be developed and designed may play the first lighting effect file to emit light. The editing module 12 is signally connected to the lighting effect file acquisition module 11 and is used to provide an editing screen for a developer to edit at least one second lighting effect file, wherein the second lighting effect file is the first lighting effect file or is generated from/by the first lighting effect file. Effective file is generated. The output module 13 is signally connected to the editing module 12 and is used to output the edited second lighting effect file.

Furthermore, the editing module 12 includes a flicker frequency checking module 121. The flicker frequency checking module 121 is used to target/mark/calibrate a portion of a plurality of sampling time points of a third lighting effect file according to a plurality of light emitting intensities of the plurality of sampling time points. According to the targeted sampling time points of the third lighting effect file, the flicker frequency checking module 121 determines whether the third lighting effect file has at least one flicker frequency exceeding a predetermined specification. The flicker frequency checking module 121 prompts the sampling time point of the third lighting effect file where/having the flicker frequency exceeds/exceeding the predetermined specification, so as to provide the developer to instantly edit and correct the second lighting effect file, wherein the third lighting effect file is the second lighting effect file or is generated from the second lighting effect file.

Furthermore, the lighting effect editing device may further include a sounding effect file acquisition module 14. The sounding effect file acquisition module 14 is signally connected to the editing module 12. The sounding effect file acquisition module 14 is used to acquire at least one first sounding effect file. A sounding emitting unit of the device to be developed and designed may play the first lighting effect file to emit sound. In addition, the editing module 12 may further enable the developer to edit at least one second sounding effect file, wherein the second sounding effect file is the first sounding effect file or is generated from the first sounding effect file. The output module 13 is signally connected to the editing module 12 and is used to output the edited second sounding effect file. Furthermore, the editing module 12 further enables the developer to edit and arrange the range in which the output second lighting effect file should flicker the lighting effect in the second sounding effect file. That is, the played time of the second lighting effect file is arranged within a specific range of the second sounding sound file.

Figure 2:
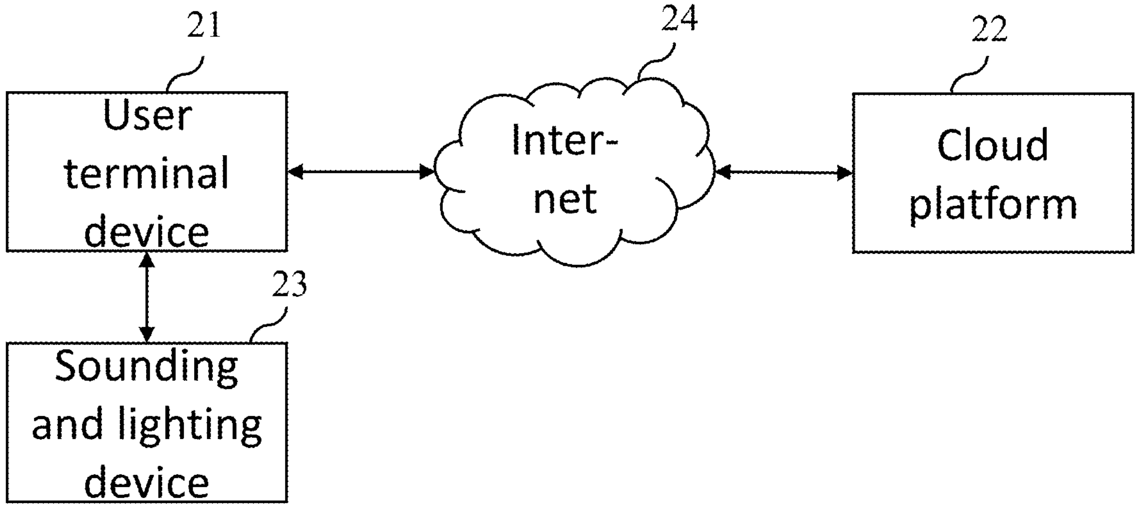
FIG. 2 is a schematic block diagram of a sounding and lighting device development system according to an embodiment of the present disclosure.

Please refer to FIG. 2, which is a schematic block diagram of a sounding and lighting device development system according to an embodiment of the present disclosure. The lighting effect editing device is mainly implemented through software and hardware circuits. Thus, the lighting effect editing device may be implemented by installing software on a cloud platform 22 in FIG. 2. According to the embodiment of FIG. 2, the sounding and lighting device development system includes a user terminal device 21 and the cloud platform 22. The user terminal device 21 is signally connected to the cloud platform 22 through the Internet 24, such that the lighting effect editing device provided by the cloud platform 22 and the user terminal device 21 are signally connected to the sounding and lighting device 23. The sounding and lighting device 23 is, for example, a toy, an advertising billboard, or other device that is capable of emitting sound and light. In addition, in other embodiments, the lighting effect editing device may be implemented by installing software on the user terminal device 21 in FIG. 2, and at this time the user terminal device 21 is not signally connected to the cloud platform 22.

Figure 3:
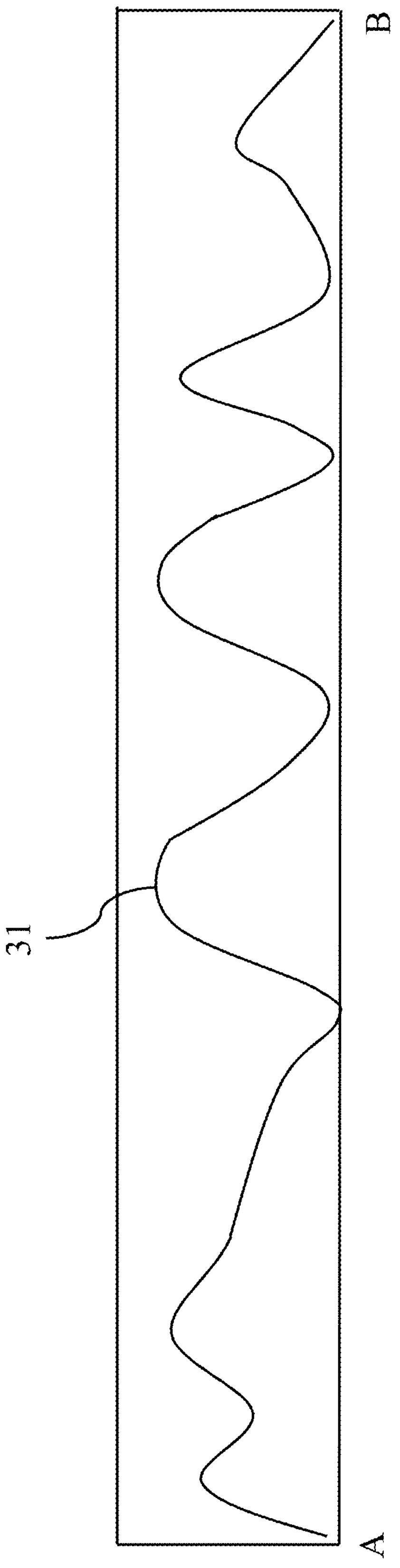
FIG. 3 is a schematic waveform diagram of a single lighting effect file played by a single light emitting unit according to an embodiment of the present disclosure.

Please refer to FIGS. 1 and 3. FIG. 3 is a schematic waveform diagram of a single lighting effect file played by a single light emitting unit according to an embodiment of the present disclosure. If the sounding and lighting device has only single one light emitting unit, and the light emitting unit only plays the lighting effect file 31 once, then at this time the first lighting effect file includes the lighting effect file 31, the second lighting effect file is the first lighting effect file, and the third lighting effect file is the second lighting effect file. That is, the flicker frequency checking module 121 of the editing device checks whether the lighting effect file 31 has any flicker frequency that does not meet the predetermined specification.

The lighting effect file 31 records a time domain signal, which includes multiple sampling time points and multiple light emitting intensities corresponding to the multiple sampling time points. The flicker frequency checking module 121 targets multiple sampling time points that can represent the perimeter corresponding to the flicker frequency mainly by checking multiple light emitting intensities of the multiple sampling time points and determines whether the flicker frequency exceeds the predetermined specification through these targeted sampling time points. In addition, the present disclosure provides two implementations of targeting the sampling time points and determining whether the flicker frequency exceeds the predetermined specification through these targeted sampling time points. These implementations will be explained in the following sections and are not described in detail here. Note that these implementation manners are not intended to limit the present disclosure.

Please refer to FIGS. 1 and 3, if the sounding and lighting device has only single one light emitting unit, and the light emitting unit plays the lighting effect file 31 repeatedly, then at this time the first lighting effect file includes the lighting effect file 31, but the editing module 12 points a last sampling time point B of the lighting effect file 31 (the first sounding effect file) to a starting sampling time point A of the lighting effect file 31 (the first sounding effect file) so as to generate the second lighting effect file. That is, the second lighting effect file is the lighting effect file 31 (the first sounding effect file) repeatedly played, and what is to be checked is the lighting effect file 31 (the first sounding effect file) that is repeatedly played, i.e., the third lighting effect file is the second lighting effect file. In other words, after the light emitting intensity of the last sampling time point B of the lighting effect file 31 is played, the light emitting intensity of the starting sampling time point A of the lighting effect file 31 is then played, and accordingly, the flicker frequency checking module 121 checks whether the lighting effect file 31 connected in series from head to tail has any flicker frequency that does not meet the predetermined specifications.

Figure 4:
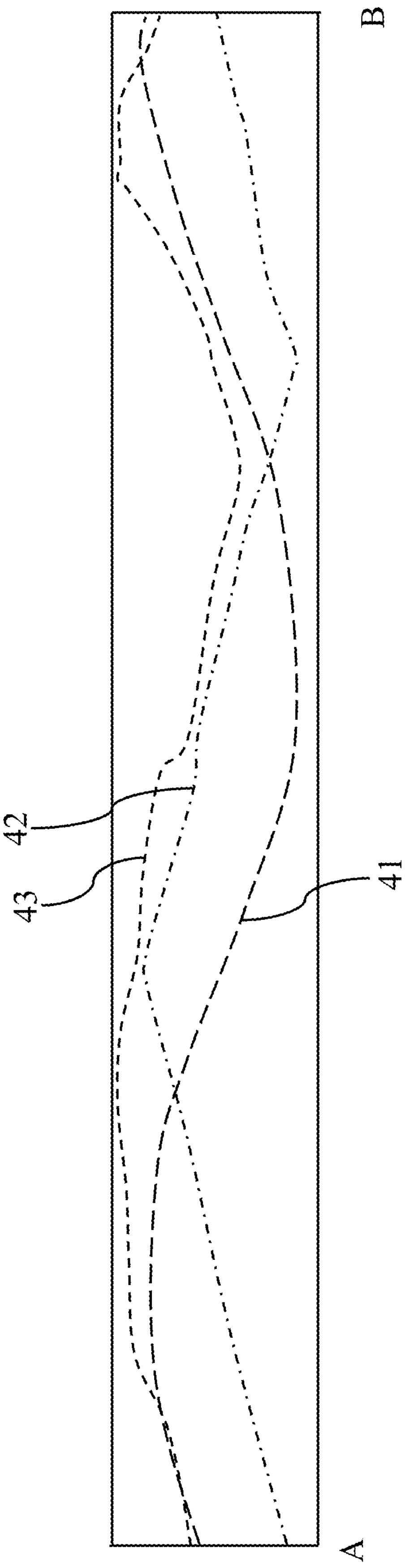
FIG. 4 is a schematic waveform diagram of two lighting effect files simultaneously played by two nearby light emitting units and a mixture of two lighting effect files according to an embodiment of the present disclosure.

Please refer to FIGS. 1 and 4. FIG. 4 is a schematic waveform diagram of two lighting effect files simultaneously played by two nearby light emitting units and a mixture of two lighting effect files according to an embodiment of the present disclosure. If the sounding and lighting device only has a plurality of light emitting units, for example, two light emitting units, and the two light emitting units are close to each other and respectively play lighting effect files 41 and 42 once, then at this time, the at least one first lighting effect file includes two first lighting effect files, the two first lighting effect files are respectively lighting effect files 41 and 42, the at least one second lighting effect file is two second lighting effect files, and the two second lighting effect files are respectively two first lighting effect files. In this case, what should be checked is the mixed flicker frequency of the lighting effect files 41 and 42 (flicker frequency after mixing light from two lighting emitting units). Thus, the third lighting effect file is lighting effect file 43 obtained by adding up lighting effect files 41 and 42 (two second lighting effect files). Specifically, for each sampling time point of the plurality of lighting effect files 41 and 42 (two second lighting effect files), the editing module 12 is used to add up a plurality of emitting intensities of the sampling time point of the plurality of lighting effect files 41 and 42 (two second lighting effect files) as the emitting intensity of the sampling time point of the lighting effect file 43 (the third lighting effect file) to generate the lighting effect file 43 (the third lighting effect file).

Please refer to FIGS. 1 and 4, if the sounding and lighting device only has a plurality of light emitting units, for example, two light emitting units, and the two light emitting units are close to each other and respectively play the lighting effect files 41 and 42 repeatedly, then at this time, the at least one first lighting effect file includes two first lighting effect files, the two first lighting effect files are respectively lighting effect files 41 and 42, the at least one second lighting effect file is two second lighting effect files, the two second lighting effect files are respectively the two first lighting effect files that are played repeatedly, and the third lighting effect file is the lighting effect file obtained by adding up the two first lighting effect files that are played repeatedly.

Furthermore, the editing module 12 respectively points the last sampling time point B of the lighting effect files 41 and 42 (the two first sounding effect files) to the starting sampling time point A of the lighting effect files 41 and 42 (the two first sounding effect files) to generate the two second lighting effect files under editing. That is, the two second lighting effect files are respectively the lighting effect files 41 and 42 (the two second sounding effect files) that are played repeatedly, and what is to be checked is the third lighting effect file generated by adding up the lighting effect files 41 and 42 (two second sounding effect files) that are played repeatedly. In other words, the editing module 12 generates the lighting effect file 43 (the third lighting effect file) connected in series from head to tail, and accordingly, the flicker frequency checking module 121 checks whether the lighting effect file 43 (the third lighting effect file) connected in series from head to tail has any flicker frequency that does not meet the predetermined specifications.

It should be noted that the example in FIG. 4 assumes that two light emitting units are close to each other, and thus the addition of the two lighting effect files 41 and 42 may be regarded as only one light emitting unit playing the lighting effect file 43 obtained by adding up the two lighting effect files 41 and 42. However, if the two light emitting units are close to each other, then the two lighting effect files 41 and 42 on which a logical OR operation are performed may be regarded as only one light emitting unit playing the lighting effect file obtained by performing the logical OR operation on the two lighting effect files 41 and 42.

Figure 5:
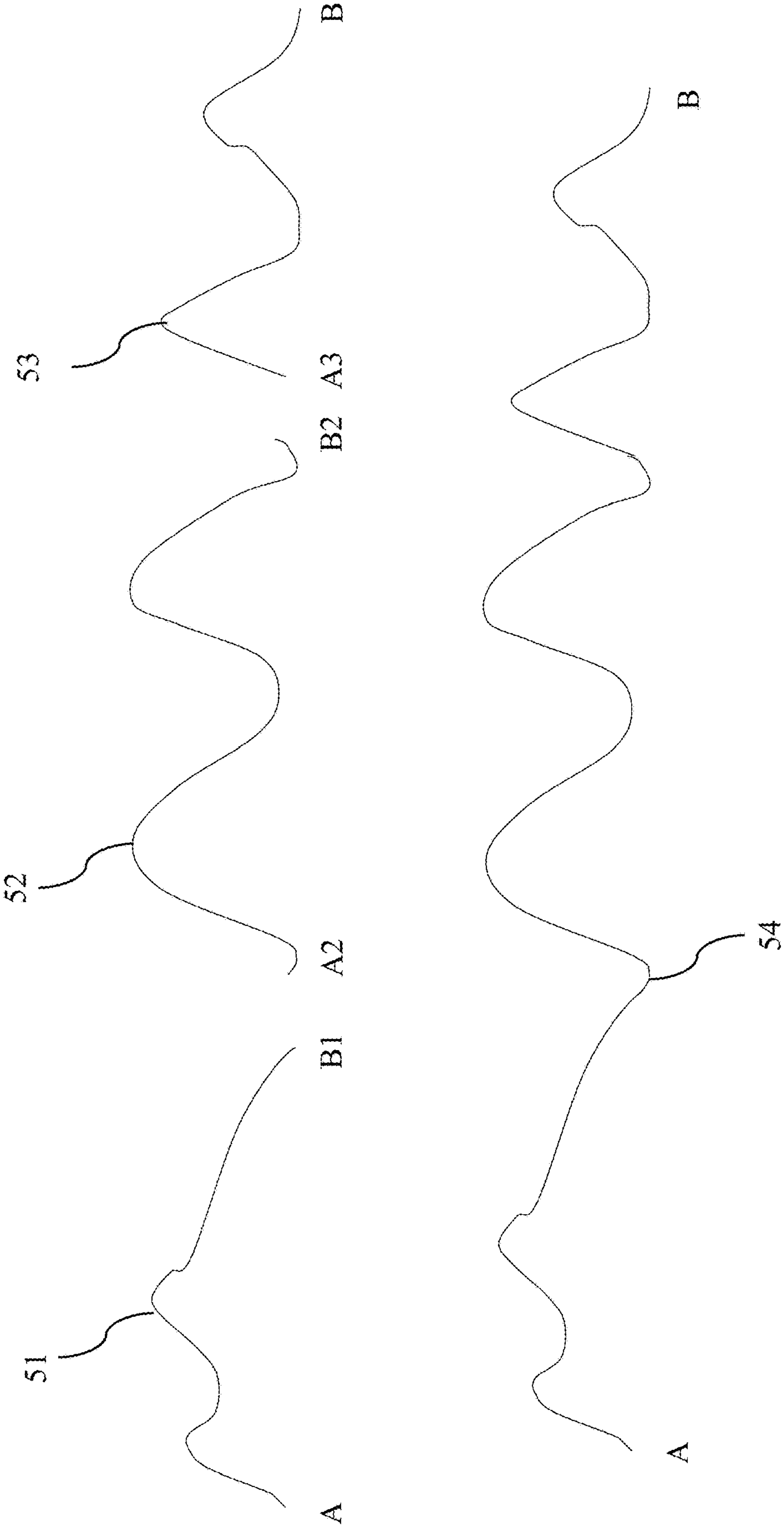
FIG. 5 is a schematic waveform diagram of three lighting effect files played by a single light emitting unit and a concatenation of three lighting effect files according to an embodiment of the present disclosure.

Please refer to FIGS. 1 and 5. FIG. 5 is a schematic waveform diagram of three lighting effect files played by a single light emitting unit and a concatenation of three lighting effect files according to an embodiment of the present disclosure. If the sounding and lighting device has only single one light emitting unit, and the light emitting unit only sequentially plays the lighting effect files 51, 52, and 53 once, then at this time at least one first lighting effect file includes a plurality of first lighting effect files, and the plurality of first lighting effect files are respectively the lighting effect files 51, 52, and 53. The second lighting effect file is the lighting effect file 54 obtained by concatenating the lighting effect files 51, 52, and 53, and the third lighting effect file to be checked is the lighting effect file 54 obtained by concatenating the lighting effect files 51, 52, and 53. Furthermore, the editing module 12 is used to point last sampling time points B1 and B2 of the lighting effect files 51 and 52 (first lighting effect file) of the lighting effect files 51, 52, and 53 (three first lighting effect files) that is not a last one of the lighting effect files 51, 52, and 53 (three first lighting effect files) to starting sampling time points A2 and A3 of the next lighting effect files 52 and 53 (first lighting effect file) so as to generate the second lighting effect file.

Please refer to FIGS. 1 and 5, if the sounding and lighting device has only a single light emitting unit, and the light emitting unit only sequentially plays the lighting effect files 51, 52, and 53 repeatedly, then at this time, the at least one first lighting effect file includes a plurality of first lighting effect files, the plurality of first lighting effect files are respectively the lighting effect files 51, 52, and 53, at least one second lighting effect file is the lighting effect file 54 obtained by concatenating the lighting effect files 51, 52, and 53 in series from head to tail, and the third lighting effect file to be checked is the lighting effect file 54 connected in series from head to tail. Furthermore, the editing module 12 is used to point last sampling time points B1 and B2 of the lighting effect files 51 and 52 (first lighting effect file) of the lighting effect files 51, 52, and 53 (three first lighting effect files) that is not a last one of the lighting effect files 51, 52, and 53 (three first lighting effect files) to starting sampling time points A2 and A3 of the next lighting effect files 52 and 53 (first lighting effect file) and point a last sampling time point B of the lighting effect file 53 (a last first lighting effect file) to a starting sampling time point A of the lighting effect file 51 (a first one first lighting effect file) to generate the lighting effect file 54 (the second lighting effect file) connected in series connected from head to tail under editing.

Figure 6:
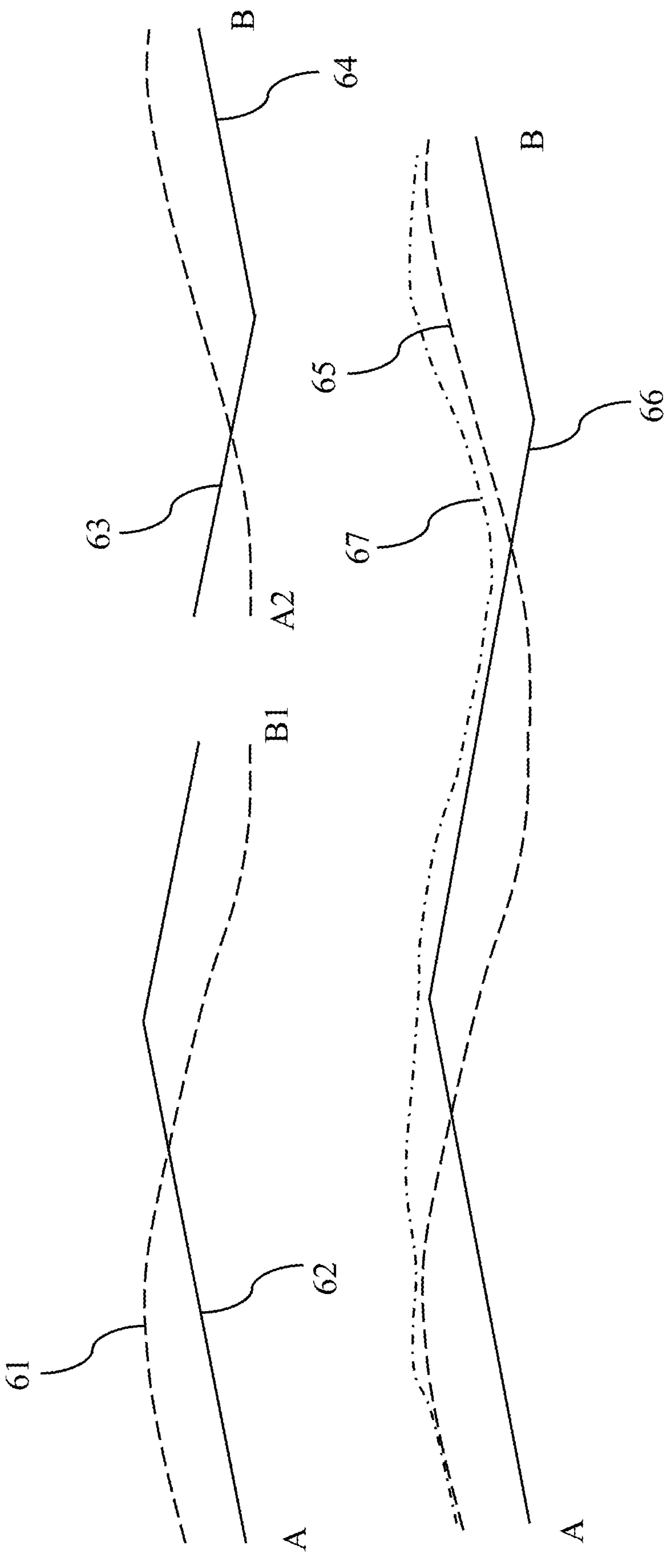
FIG. 6 is a schematic waveform diagram of four lighting effect files respectively played by two nearby light emitting units and a mixture and concatenation of four lighting effect files according to an embodiment of the present disclosure.

Please refer to FIGS. 1 and 6. FIG. 6 is a schematic waveform diagram of four lighting effect files respectively played by two nearby light emitting units and a mixture and concatenation of four lighting effect files according to an embodiment of the present disclosure. If the sounding and lighting device has only a plurality of light emitting units, for example, two light emitting units, the two light emitting units are close to each other, one of the light emitting units sequentially plays the lighting effect files 61 and 63 once, and the other light emitting unit sequentially plays the lighting effect files 61 and 63 once, then at this time, the at least one first lighting effect file includes four first lighting effect files, the four first lighting effect files are respectively lighting effect files 61 to 64, at least one second lighting effect file is two second lighting effect files, where one of the second lighting effect files is the lighting effect file 65, the other second lighting effect file is the lighting effect file 66, and the third lighting effect file to be checked is the lighting effect file 67.

Furthermore, the editing module 12 points a last sampling time point B1 of the lighting effect files 61 and 62 (not the last first lighting effect file) to a starting sampling time A2 of the lighting effect files 63 and 64 (the next first lighting effect file) to generate the lighting effect files 65 and 66 (second lighting effect files) under editing by/for each light emitting unit. For each sampling time point of the lighting effect files 65 and 66 (a plurality of second lighting effect files), the editing module 12 is used to add up the plurality of emitting intensities of the sampling time point of the lighting effect files 65 and 66 (the plurality of second lighting effect files) as the emitting intensity of the sampling time point of the lighting effect file 67 (the third lighting effect file) to generate the lighting effect file 67 (the third lighting effect file).

Please refer to FIGS. 1 and 6, if the sounding and lighting device has only a plurality of light emitting units, for example, two light emitting units, the two light emitting units are close to each other, one of the lighting emitting units sequentially plays the lighting effect files 61 and 63 repeatedly, and the other light emitting unit sequentially plays the lighting effect files 61 and 63 repeatedly, then at this time, the at least one first lighting effect file includes four first lighting effect files, the four first lighting effect files are respectively lighting effect files 61 to 64, at least one second lighting effect file is two second lighting effect files, where one of the second lighting effect files is the repeated lighting effect file 65, the other second lighting effect files is the repeated lighting effect file 66, and the third lighting effect file to be checked is the repeated lighting effect file 67. As for how to generate repeated lighting effect files 65 to 67, it can be understood from the previous explanation, so it will not be narrated herein.

Figure 7:
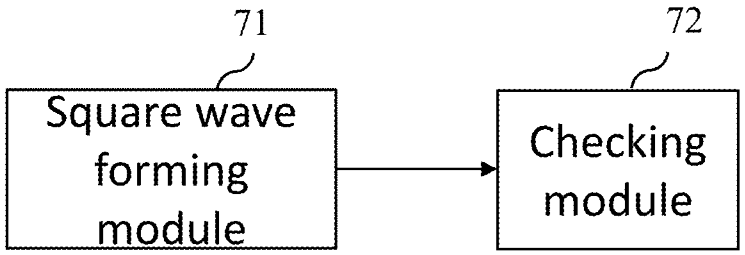
FIG. 7 is a schematic block diagram of a flicker frequency checking module according to an embodiment of the present disclosure.

Please refer to FIG. 7, which is a schematic block diagram of a flicker frequency checking module according to an embodiment of the present disclosure. The flicker frequency checking module may include a square wave forming module 71 and a checking module 72 signally connected to the square wave forming module 71. This flicker frequency checking module may be used to check various third lighting effect files mentioned above. The square wave forming module 71 performs slicing processing on the plurality of emitting intensities of the plurality of sampling time points of the third lighting effect file to generate a square wave signal comprising a plurality of square waves, wherein the emitting intensity less than a emitting intensity threshold is adjusted to zero, and the emitting intensity not less than the emitting intensity threshold is adjusted to a specific emitting intensity. The checking module 72 obtains the aforementioned targeted plurality of sampling time points. The targeted sampling time point is a sampling time point corresponding to a rising edge or a falling edge of the square wave. The checking module 72 checks a time duration from the rising edge of the square wave to the rising edge of another square wave (i.e., the time duration between rising edges of two adjacent square waves) and a time duration from the falling edge of the square wave to the falling edge of another square wave (i.e., the time duration between falling edges of two adjacent square waves) to determine whether the third lighting effect file has the at least one flicker frequency exceeding the predetermined specification. Furthermore, when the time duration between the rising edges of two adjacent square waves or the time duration between the falling edges of two adjacent square waves is less than the predetermined duration, it indicates that the flicker frequency exceeds the predetermined specification, and at this time, the editing module notifies the developer of the corresponding targeted two sampling time points, enabling the developer to edit the second lighting effect file to avoid the flicker frequency exceeding the predetermined specification.

Figure 8:
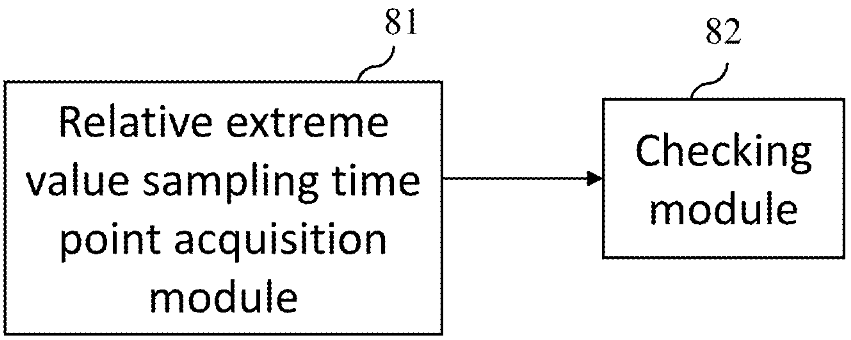
FIG. 8 is a schematic block diagram of a flicker frequency checking module according to another embodiment of the present disclosure.

Please refer to FIG. 8, which is a schematic block diagram of a flicker frequency checking module according to another embodiment of the present disclosure. The flicker frequency checking module may include a relative extreme value sampling time point acquisition module 81 and a checking module 82 signally connected to the relative extreme value sampling time point acquisition module 81. The flicker frequency checking module may be used to check various third lighting effect files mentioned above. The relative extreme value sampling time point acquisition module 81 searches for a plurality of relative maximum values local_max(i) and a plurality of relative minimum values local_min(j) among the plurality of light emitting intensities of the plurality of sampling time points of the third lighting effect file, where i is an integer ranging from 1 to N, j is an integer ranging from 1 to M, and N and M are integers greater than or equal to 2. The checking module 72 obtains the aforementioned targeted plurality of sampling time points. The targeted sampling time point is a sampling time point local_max_t(i) corresponding to a relative maximum value local_max(i) or a sampling time point local_min_t(j) corresponding to a relative minimum value local_min(j). Then, the checking module 82 checks the time duration local_max_t(i+1)-local_max_t(i) between the two sampling time points local_max_t(i) and local_max_t(i+1) for each pair of adjacent relative maximum values local_max(i) and local_max(i+1) and the time duration local_min_t(j+1)-local_min_t(j) between the two sampling time points local_min_t(j) and local_min_t(j+1) for each pair of adjacent relative minimum values local_min_t(j) and local_min_t(j+1) to determine whether the third lighting effect file has the at least one flicker frequency exceeding the predetermined specification. Furthermore, when the time duration local_min_t(j+1)-local_min_t(j) or the time duration local_max_t(i+1)-local_max_t(i) is less than the predetermined duration, it indicates that the flicker frequency exceeds the predetermined specification, and at this time, the editing module notifies the developer of the corresponding targeted two sampling time points, enabling the developer to edit the second lighting effect file to avoid the flicker frequency exceeding the predetermined specification.

Figure 9:
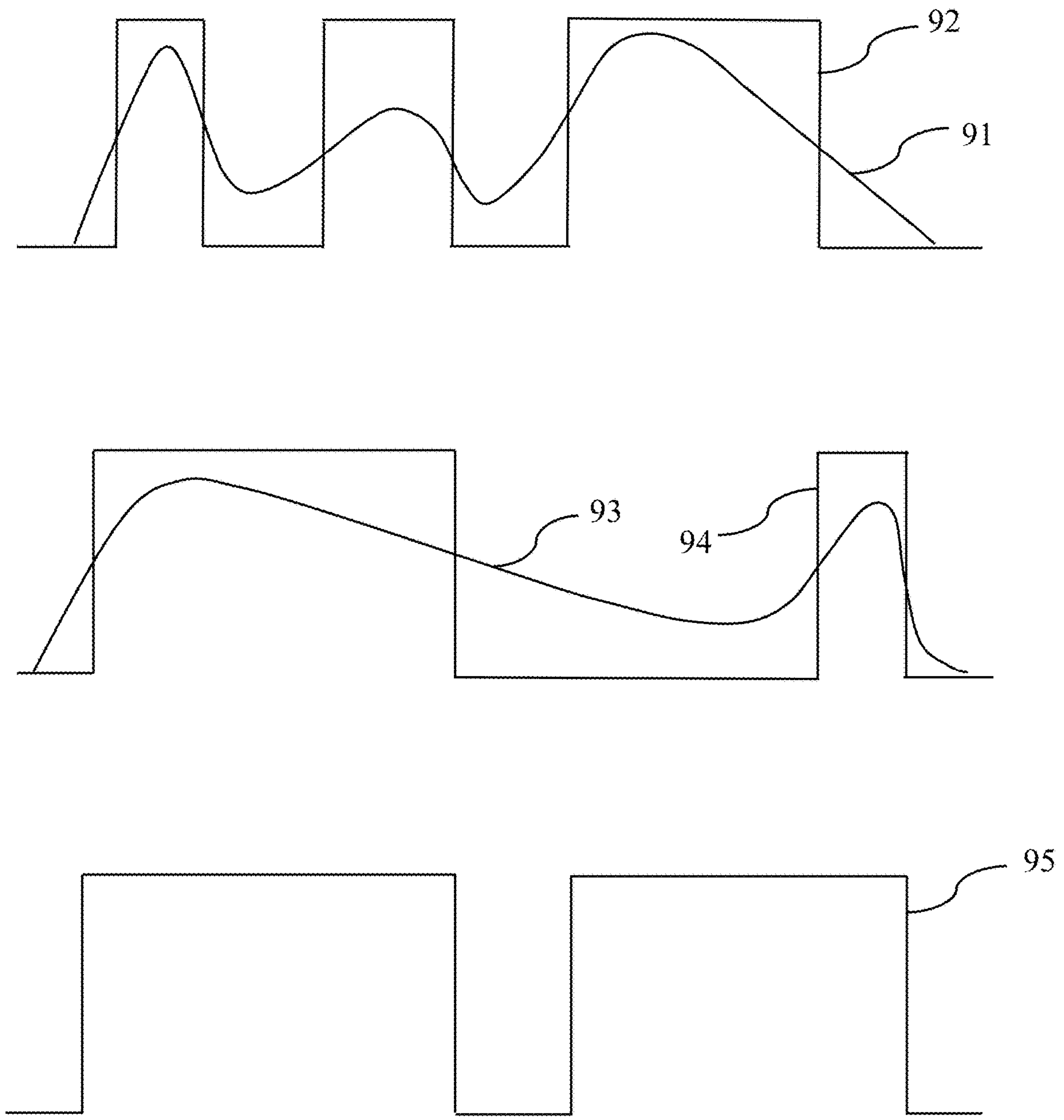
FIG. 9 is a schematic waveform diagram of two lighting effect files respectively played by two distant light emitting units, a mixture of two lighting effect files, and the corresponding square wave signal according to an embodiment of the present disclosure.

Please refer to FIGS. 7 and 9. FIG. 9 is a schematic waveform diagram of two lighting effect files respectively played by two distant light emitting units, a mixture of two lighting effect files, and the corresponding square wave signal according to an embodiment of the present disclosure. In the present embodiment, two adjacent but relatively distant light emitting units respectively play lighting effect files 91 and 93 (first lighting effect files) once, the second lighting effect files on the editing screen are the lighting effect files 91 and 93, and the third lighting effect file to be checked is the mixed square wave waveform 95. The square wave forming module 71 performs slicing processing on the plurality of emitting intensities of the plurality of sampling time points of the lighting effect files 91 and 93 (second lighting effect file) to respectively generate square wave signals 92 and 94. Then, the square wave forming module 71 performs the logical OR operation on the square wave signals 92 and 94 to generate the mixed square wave waveform 95. The checking module 72 obtains the aforementioned targeted plurality of sampling time points. The targeted sampling time point is a sampling time point corresponding to a rising edge or a falling edge of the square wave 95. The checking module 72 checks a time duration from the rising edge of the square wave of the square wave waveform 95 to the rising edge of another square wave of the square wave waveform 95 (i.e., the time duration between rising edges of two adjacent square waves) and a time duration from the falling edge of the square wave of the square wave waveform 95 to the falling edge of another square wave of the square wave waveform 95 (i.e., the time duration between falling edges of two adjacent square waves) to determine whether of the square wave waveform 95 (the third lighting effect file) has the at least one flicker frequency exceeding the predetermined specification. Furthermore, when the time duration between the rising edges of two adjacent square waves or the time duration between the falling edges of two adjacent square waves is less than the predetermined duration, it indicates that the flicker frequency exceeds the predetermined specification, and at this time, the editing module notifies the developer of the corresponding targeted two sampling time points, enabling the developer to edit the second lighting effect file to avoid the flicker frequency exceeding the predetermined specification.

In addition, according to the above explanation, the present disclosure additionally provide a lighting effect editing method including the following steps: acquiring at least one first lighting effect file, wherein a light emitting unit plays the first lighting effect file to emit light; providing an editing screen/scene for a developer to edit a second lighting effect file, wherein the second lighting effect file is the first lighting effect file or generated from the first lighting effect file; targeting/marking/calibrating a portion of a plurality of sampling time points of a third lighting effect file according to a plurality of light emitting intensities of the plurality of sampling time points, wherein the third lighting effect file is the second lighting effect file or generated from the second lighting effect file; determining, according to the targeted sampling time points of the third lighting effect file, whether the third lighting effect file has at least one flicker frequency exceeding a predetermined specification, and prompting the sampling time point of the third lighting effect file where/having the flicker frequency exceeds/exceeding the predetermined specification for providing the developer to instantly edit and correct the second lighting effect file; and outputting the edited second lighting effect file.

To sum up, the lighting effect editing device and method provided by the present disclosure enable developers to directly check whether a single lighting effect file or a mixture of multiple lighting effect files causes a flicker frequency of a light emitting unit to exceed a predetermined specification when the developers edit the lighting effect file, and the sampling points of the lighting effect file where the flicker frequency exceeds the predetermined specification is prompted. Thus, the present disclosure solve the technical issues of requiring manual check to determine whether the lighting effects have flicker frequency that fails to meet predetermined specifications. In addition, the lighting effect editing device and method address the technical issues of checking the flicker frequency of multiple light emitting units after mixing. Furthermore, the lighting effect editing device and method may even find the exact location within the lighting effect file where the flicker frequency fails to meet the predetermined specifications.

It should be understood that the examples and the embodiments described herein are for illustrative purpose only, and various modifications or changes in view of them will be suggested to those skilled in the art, and will be comprised in the spirit and scope of the application and the appendix with the scope of the claims.

What is claimed is:

1. A lighting effect editing device, comprising:

a lighting effect file acquisition module, configured to acquire at least one first lighting effect file, wherein at least one light emitting unit plays the first lighting effect file to emit light;

an editing module, signally connected to the lighting effect file acquisition module and configured to edit at least one second lighting effect file, wherein the second lighting effect file is the first lighting effect file or generated from the first lighting effect file; and an output module, signally connected to the editing module and configured to output the edited second lighting effect file, wherein the editing module comprises a flicker frequency checking module configured to target a portion of sampling time points of a third lighting effect file based on light emitting intensities of the sampling time points, wherein based on the targeted sampling time points of the third lighting effect file, the flicker frequency checking module determines whether the third lighting effect file has at least one flicker frequency exceeding a predetermined specification, and prompts the sampling time point of the third lighting effect file where the flicker frequency exceeds the predetermined specification, wherein the third lighting effect file is the second lighting effect file or generated from the second lighting effect file.

2. The lighting effect editing device according to the claim 1, wherein the second lighting effect file is the first lighting effect file, and the third lighting effect file is the second lighting effect file; or wherein the at least one light emitting unit repeatedly plays the first lighting effect file to emit light, wherein the editing module is configured to point a last sampling time point of the first lighting effect file to a starting sampling time point of the first lighting effect file, so as to generate the second lighting effect file, so that the second lighting effect file is the first lighting effect file repeatedly played, and the third lighting effect file is the second lighting effect file.

3. The lighting effect editing device according to the claim 1, wherein the at least one first lighting effect file comprises a plurality of first lighting effect files, and the at least one light emitting unit sequentially plays the plurality of first lighting effect files to emit light, the editing module is configured to point a last sampling time point of the first lighting effect file of the plurality of first lighting effect files that is not a last one of the plurality of first lighting effect files to a starting sampling time point of a next one of the plurality of first lighting effect files to generate the second lighting effect file, and the third lighting effect file is the second lighting effect file; or wherein the at least one first lighting effect file comprises a plurality of first lighting effect files, and the at least one light emitting unit sequentially and repeatedly plays the plurality of first lighting effect files to emit light, the editing module is configured to point a last sampling time point of the first lighting effect file of the plurality of first lighting effect files that is not a last one of the plurality of first lighting effect files to a starting sampling time point of a next one of the plurality of first lighting effect files and pointing a last sampling time point of a last one of the plurality of first lighting effect files to a starting sampling time point of a first one of the plurality of first lighting effect files to generate the second lighting effect file under editing, and the third lighting effect file is the second lighting effect file.

4. The lighting effect editing device according to the claim 1, wherein the at least one first lighting effect file comprises a plurality of first lighting effect files, the at least one light emitting unit comprises a plurality of light emitting units, the plurality of light emitting units respectively play the plurality of first lighting effect files to emit light, the at least one second lighting effect file comprises a plurality of second lighting effect files, and the plurality of second lighting effect files are respectively the plurality of first lighting effect files, wherein for each sampling time point of the plurality of second lighting effect files, the editing module is configured to add up a plurality of emitting intensities of the sampling time point of the plurality of second lighting effect files as the emitting intensity of the sampling time point of the third lighting effect file to generate the third lighting effect file; or the plurality of light emitting units respectively and repeatedly play the plurality of first lighting effect files to emit light, the at least one second lighting effect file comprises a plurality of second lighting effect files, and for the generation of each of the plurality of second lighting effect files, the editing module is configured to point a last sampling time point of the corresponding first lighting effect file to a starting sampling time point of the corresponding first lighting effect file, so that each of the plurality of second lighting effect files is a corresponding one of the plurality of first lighting effect files that is repeatedly played, wherein for each sampling time point of the plurality of second lighting effect files, the editing module is configured to add up a plurality of emitting intensities of the sampling time point of the plurality of second lighting effect files as the emitting intensity of the sampling time point of the third lighting effect file to generate the third lighting effect file.

5. The lighting effect editing device according to the claim 1, wherein the at least one first lighting effect file comprises a plurality of first lighting effect files, the at least one light emitting unit comprises a plurality of light emitting units, wherein the plurality of light emitting units sequentially play a portion of the plurality of first lighting effect files to emit light, wherein for the plurality of first lighting effect files played by each of the plurality of emitting units, the editing module is configured to point a last sampling time point of the first lighting effect file of the plurality of first lighting effect files that is not a last one of the plurality of first lighting effect files to a starting sampling time point of a next one of the plurality of first lighting effect files to generate the second lighting effect file for each of the plurality of emitting units, wherein for each sampling time point of the plurality of second lighting effect files, the editing module is configured to add up the plurality of emitting intensities of the sampling time point of the plurality of second lighting effect files as the emitting intensity of the sampling time point of the third lighting effect file to generate the third lighting effect file.

6. The lighting effect editing device according to the claim 1, wherein the at least one first lighting effect file comprises a plurality of first lighting effect files, the at least one light emitting unit comprises a plurality of light emitting units, wherein the plurality of light emitting units respectively play the plurality of first lighting effect files to emit light, the at least one second lighting effect file comprises a plurality of second lighting effect files, and the plurality of second lighting effect files are respectively the plurality of first lighting effect files, wherein the editing module is configured to compare a plurality of emitting intensities at the sampling time points of the plurality of second lighting effect files and select a strongest one of the plurality of emitting intensities as the emitting intensity of the corresponding one of the sampling time points of the third lighting effect file to generate the third lighting effect file.

7. The lighting effect editing device according to the claim 1, wherein the flicker frequency checking module performs slicing processing on the plurality of emitting intensities of the plurality of sampling time points of the third lighting effect file to generate a square wave signal comprising a plurality of square waves, wherein the emitting intensity less than a emitting intensity threshold is adjusted to zero, and the emitting intensity not less than the emitting intensity threshold is adjusted to a specific emitting intensity, the targeted sampling time point is a sampling time point corresponding to a rising edge or a falling edge of the square wave, and a time duration from the rising edge of the square wave to the rising edge of another square wave and a time duration from the falling edge of the square wave to the falling edge of another square wave are checked to determine whether the third lighting effect file has the at least one flicker frequency exceeding the predetermined specification.

8. The lighting effect editing device according to the claim 1, wherein the at least one first lighting effect file comprises a plurality of first lighting effect files, a plurality of light emitting units respectively play the plurality of first lighting effect files to emit light, and the plurality of second lighting effect files are respectively the plurality of first lighting effect files, the flicker frequency checking module performs slicing processing on the plurality of emitting intensities of the plurality of sampling time points of each second lighting effect file to generate a plurality of square wave signals comprising a plurality of square waves, wherein the emitting intensity less than a emitting intensity threshold is adjusted to zero, and the emitting intensity not less than the emitting intensity threshold is adjusted to a specific emitting intensity, the flicker frequency checking module performs a logic OR operation on the plurality of square waves to generate a mixed square wave signal, the third lighting effect file is the mixed square wave signal, the targeted sampling time point is a sampling time point corresponding to a rising edge or a falling edge of the square wave of the mixed square wave signal, and a time duration from the rising edge of the square wave of the mixed square wave signal to the rising edge of another square wave and a time duration from the falling edge of the square wave of the mixed square wave signal to the falling edge of another square wave are checked to determine whether the third lighting effect file has the at least one flicker frequency exceeding the predetermined specification.

9. The lighting effect editing device according to the claim 1, wherein the flicker frequency checking module searches for a plurality of relative maximum values and a plurality of relative minimum values among the plurality of light emitting intensities of the plurality of sampling time points of the third lighting effect file to determine whether the third lighting effect file has the at least one flicker frequency exceeding the predetermined specification, wherein the targeted sampling time point is a sampling time point of the relative maximum value or the relative minimum value, a time duration between every two sampling time points of two adjacent relative maximum values and a time duration between every two sampling time points of two adjacent relative minimum values are checked.

10. A lighting effect editing method, comprising:

acquiring at least one first lighting effect file, wherein a light emitting unit plays the first lighting effect file to emit light;

providing an editing screen for editing a second lighting effect file, wherein the second lighting effect file is the first lighting effect file or generated from the first lighting effect file;

targeting a portion of a plurality of sampling time points of a third lighting effect file according to a plurality of light emitting intensities of the plurality of sampling time points, wherein the third lighting effect file is the second lighting effect file or generated from the second lighting effect file;

determining, according to the targeted sampling time points of the third lighting effect file, whether the third lighting effect file has at least one flicker frequency exceeding a predetermined specification, and prompting the sampling time point of the third lighting effect file where the flicker frequency exceeds the predetermined specification; and outputting the edited second lighting effect file.

11. A lighting effect editing device, comprising:

a lighting effect file acquisition module, configured to acquire a lighting effect file, wherein a light emitting unit plays the lighting effect file to emit light;

an editing module, configured to edit the lighting effect file;

a flicker frequency checking module, configured to determine whether the edited lighting effect file has a sampling time point at which at least one flicker frequency exceeds a predetermined specification, and prompt the sampling time point of the edited lighting effect file; and an output module, configured to output the edited lighting effect file.

* * * * *